(12) United States Patent
Garvey

(10) Patent No.: US 7,767,597 B2
(45) Date of Patent: Aug. 3, 2010

(54) FIRE-BARRIER FILM LAMINATE

(75) Inventor: Chad E. Garvey, Lewiston, NY (US)

(73) Assignee: Unifrax I LLC, Niagara Falls, NY (US)

( * ) Notice: Subject to any disclaimer, the term of this patent is extended or adjusted under 35 U.S.C. 154(b) by 108 days.

(21) Appl. No.: 12/008,040

(22) Filed: Jan. 8, 2008

(65) Prior Publication Data

US 2008/0166937 A1 Jul. 10, 2008

Related U.S. Application Data

(60) Provisional application No. 60/879,134, filed on Jan. 8, 2007.

(51) Int. Cl.
*D04H 1/00* (2006.01)
*B32B 27/12* (2006.01)

(52) U.S. Cl. .............. 442/2; 442/20; 442/29; 442/43; 442/44; 442/45; 442/49; 442/50; 442/58; 442/136; 428/920; 428/921

(58) Field of Classification Search .......... 428/920, 428/921; 442/2, 20, 29, 43, 44, 45, 49, 50, 442/58, 136

See application file for complete search history.

(56) References Cited

U.S. PATENT DOCUMENTS

| | | |
|---|---|---|
| 3,458,329 A | 7/1969 | Hatch et al. |
| 3,567,162 A | 3/1971 | Lea et al. |
| 4,255,483 A | 3/1981 | Byrd et al. |
| 4,600,634 A | 7/1986 | Langer |
| 4,746,403 A | 5/1988 | Ko et al. |
| 4,943,473 A | 7/1990 | Sahatjian et al. |
| 5,108,821 A | 4/1992 | Dooley et al. |
| RE34,020 E | 8/1992 | Briggs et al. |
| 5,167,876 A | 12/1992 | Lem et al. |
| 5,332,699 A | 7/1994 | Olds et al. |
| 5,389,435 A | 2/1995 | Yap |
| 5,418,050 A | 5/1995 | Keefover-Ring et al. |

(Continued)

FOREIGN PATENT DOCUMENTS

WO  WO 90/06847  6/1990

OTHER PUBLICATIONS

Alain Jacques and Nicolas Orance, Development of a Thermal/Acoustic Insulating Blanket Responding to the FAR 25.856 by the Integration of Mica Flame Barrier, Fire and Cabin Safety Research Conference, Lisbon, Nov. 18, 2004.

(Continued)

*Primary Examiner*—Ula C Ruddock
(74) *Attorney, Agent, or Firm*—Curatolo Sidoti Co., LPA; Joseph G. Curatolo; Salvatore A. Sidoti

(57) ABSTRACT

A fire-blocking paper (22, 52) is adapted for incorporation into a fire-barrier film laminate (16, 46) for use in thermal and acoustical insulation systems (10, 40), such as, but not limited to, those used in commercial aircraft. The fire-blocking inorganic fiber paper (22, 52) can be laminated to a flame resistant film (24a, 24b, 54a, 54b). The fire-blocking paper (22, 52) may include inorganic bio-soluble fiber, chopped glass non-respirable fibers, organic reinforcing fibers, organic binder, and inorganic binder or filler; and, optionally or refractory ceramic fibers.

18 Claims, 5 Drawing Sheets

U.S. PATENT DOCUMENTS

| | | | |
|---|---|---|---|
| 5,460,864 A | 10/1995 | Heitkamp | |
| 5,585,312 A | 12/1996 | TenEyck et al. | |
| 5,595,817 A | 1/1997 | Schafer et al. | |
| 5,654,063 A | 8/1997 | Kirk et al. | |
| 5,714,421 A | 2/1998 | Olds et al. | |
| 5,759,659 A | 6/1998 | Sanocki et al. | |
| 5,811,360 A | 9/1998 | Jubb | |
| 5,821,183 A | 10/1998 | Jubb | |
| 5,851,663 A | 12/1998 | Parsons et al. | |
| 5,874,375 A | 2/1999 | Zoitos et al. | |
| 5,928,075 A | 7/1999 | Miya et al. | |
| 5,942,330 A | 8/1999 | Kelley | |
| 5,955,177 A | 9/1999 | Sanocki et al. | |
| 5,955,389 A | 9/1999 | Jubb | |
| 6,022,914 A | 2/2000 | Nowak et al. | |
| 6,025,288 A | 2/2000 | Zoitos et al. | |
| 6,030,910 A | 2/2000 | Zoitos et al. | |
| 6,112,488 A | 9/2000 | Olson et al. | |
| 6,128,874 A | 10/2000 | Olson et al. | |
| 6,143,819 A | 11/2000 | Nakanishi | |
| 6,265,333 B1 | 7/2001 | Dzenis et al. | |
| 6,271,156 B1 | 8/2001 | Gleason et al. | |
| 6,358,591 B1 | 3/2002 | Smith | |
| 6,365,267 B1 * | 4/2002 | Langer et al. | 428/324 |
| 6,551,951 B1 * | 4/2003 | Fay et al. | 442/82 |
| 6,627,561 B1 | 9/2003 | Wulliman et al. | |
| 6,670,291 B1 * | 12/2003 | Tompkins et al. | 442/136 |
| 6,861,381 B1 | 3/2005 | Jubb et al. | |
| 6,884,321 B2 * | 4/2005 | Erb et al. | 162/145 |
| 6,890,638 B2 | 5/2005 | Nguyen et al. | |
| 6,953,757 B2 | 10/2005 | Zoitos et al. | |
| 7,153,796 B2 | 12/2006 | Jubb et al. | |
| 7,259,118 B2 | 8/2007 | Jubb et al. | |
| 2003/0099833 A1 | 5/2003 | Erb et al. | |
| 2004/0132364 A1 | 7/2004 | Wulliman et al. | |
| 2007/0081042 A1 | 4/2007 | Muller et al. | |

OTHER PUBLICATIONS

Alain Jacques and Nicolas Orance, Fire and Cabin Safety Research, Development of an Insulation Responding to the FAR 25.856 by the Integration of Mica Flame Barrier, International Aircraft Materials Fire Test Working Group Meeting, Atlanta, Oct. 20, 2005.

* cited by examiner

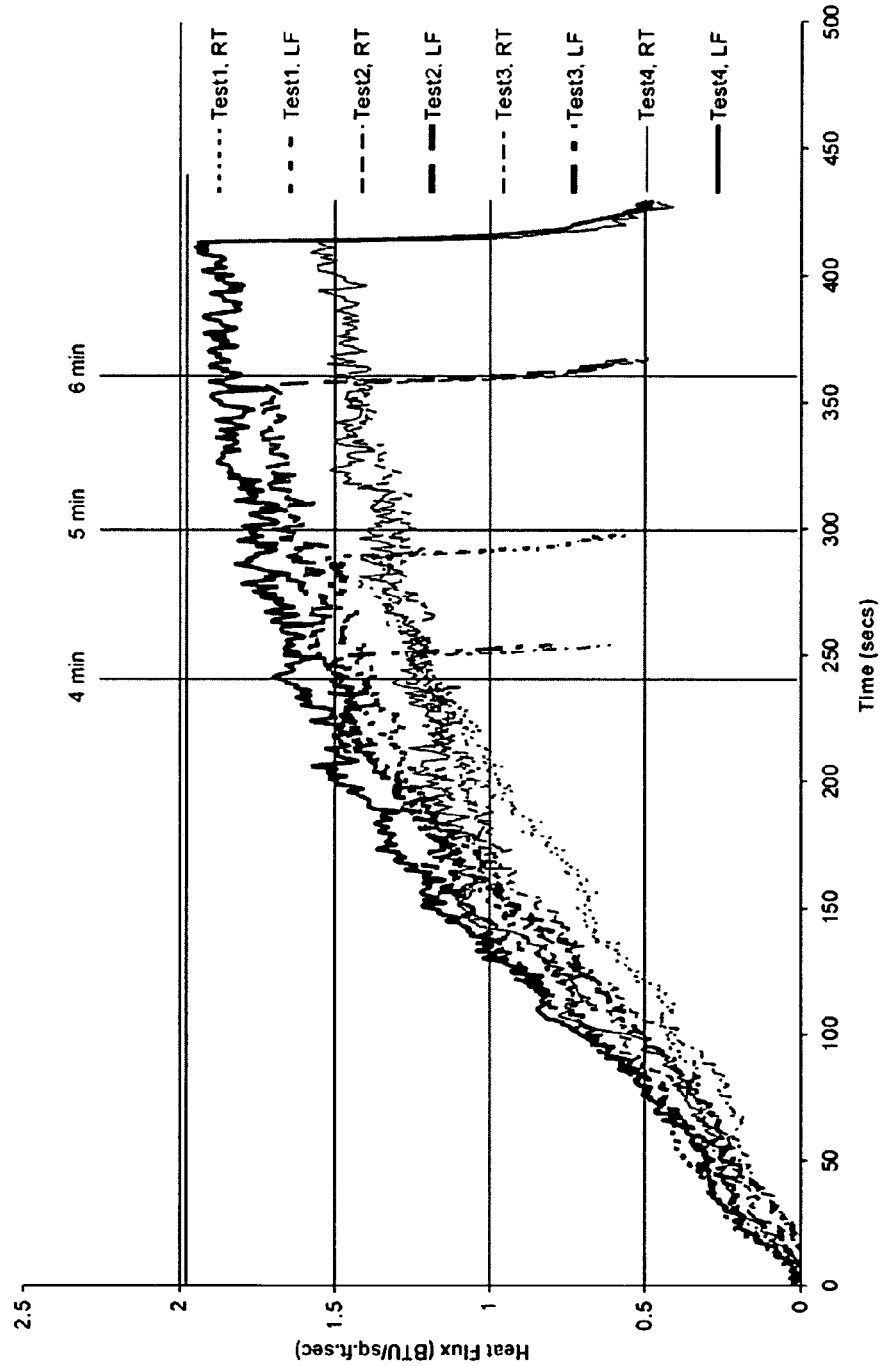

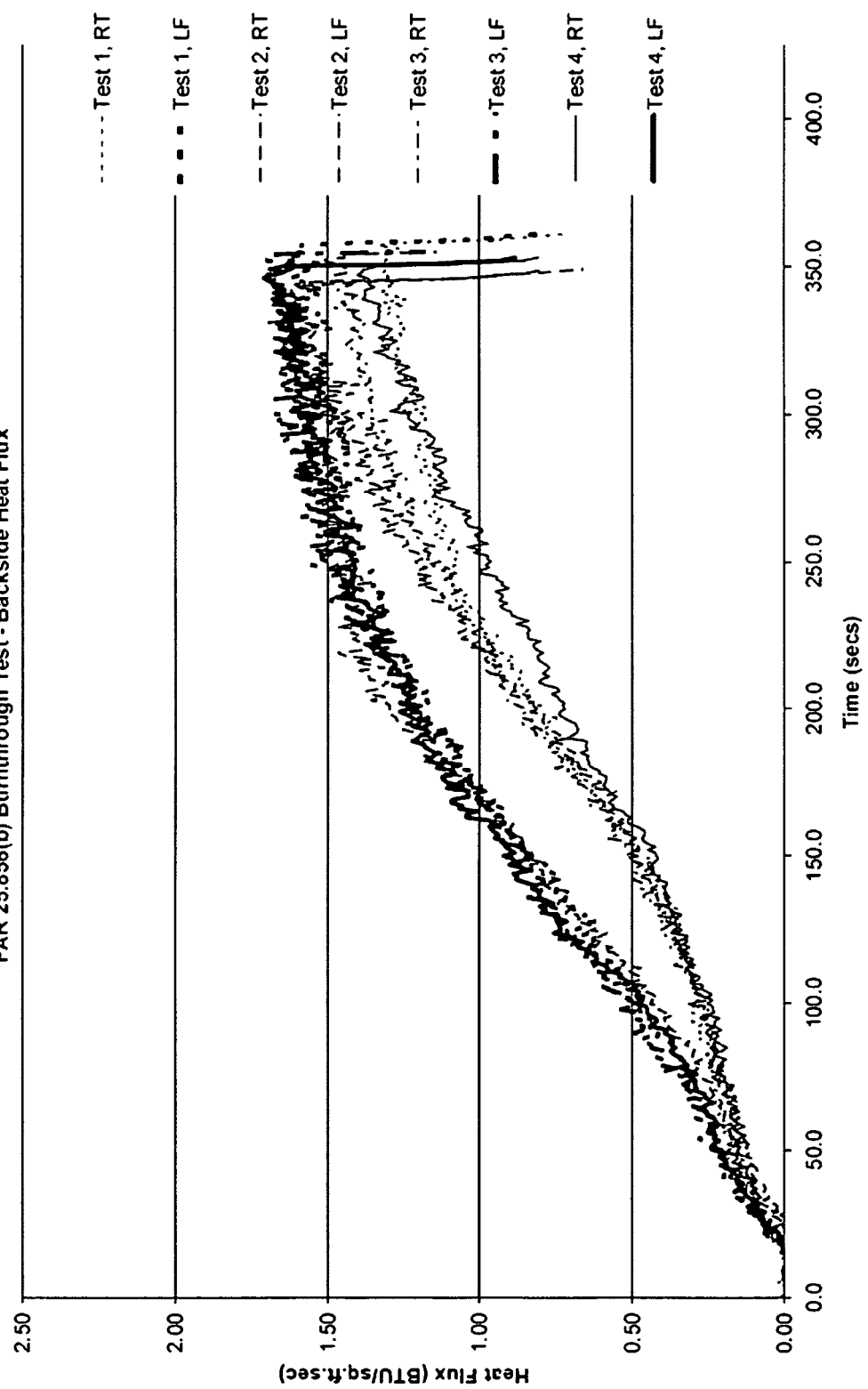

FIRE-BARRIER FILM LAMINATE

CROSS REFERENCE TO RELATED APPLICATIONS

This application claims the benefit of the filing date, under 35 U.S.C. §119(e), of U.S. Provisional Application for Patent Ser. No. 60/879,134, filed on Jan. 8, 2007, which is incorporated herein by reference as if fully written out below.

TECHNICAL FIELD

A fire-blocking paper adapted for incorporation into a fire-barrier film laminate is provided for use in thermal and acoustical insulation systems, such as, but not limited to, those used in commercial aircraft.

BACKGROUND

The Federal Aviation Administration (FAA) has promulgated regulations, contained in part in 14 CFR §25.856 (a) & (b), requiring thermal and acoustical insulation blanket systems in commercial aircraft to provide improved burn through protection and flame propagation resistance. These systems typically include thermal and acoustical insulation blankets encapsulated within a film covering or bag. As the thermal and acoustical insulation systems are currently constructed, the burn through regulations primarily affect the contents of the insulation systems bags and the flame propagation resistance regulations primarily affect the film coverings used to fabricate the bags. The film coverings typically are used as a layer or covering, for example, interleaved between, laid over, or laid behind layers of thermal and acoustical insulation material, or as a covering or bag for partially or totally encapsulating one or more layers of thermal and acoustical insulation material.

BRIEF DESCRIPTION OF THE DRAWINGS

FIG. 3 is a graph showing the backside heat flux of four sets of two fire-barrier laminate-protected thermal and acoustical insulation blanket specimens according to the embodiment of FIGS. 1A and 1B, as a function of time during a burn-through resistance test.

FIG. 5 is a graph showing the backside heat flux of four sets of two fire-barrier laminate-protected thermal and acoustical insulation blanket specimens according to the embodiment of FIGS. 4A and 4B, as a function of time during a burn-through resistance test.

DETAILED DESCRIPTION

Figure 1A:
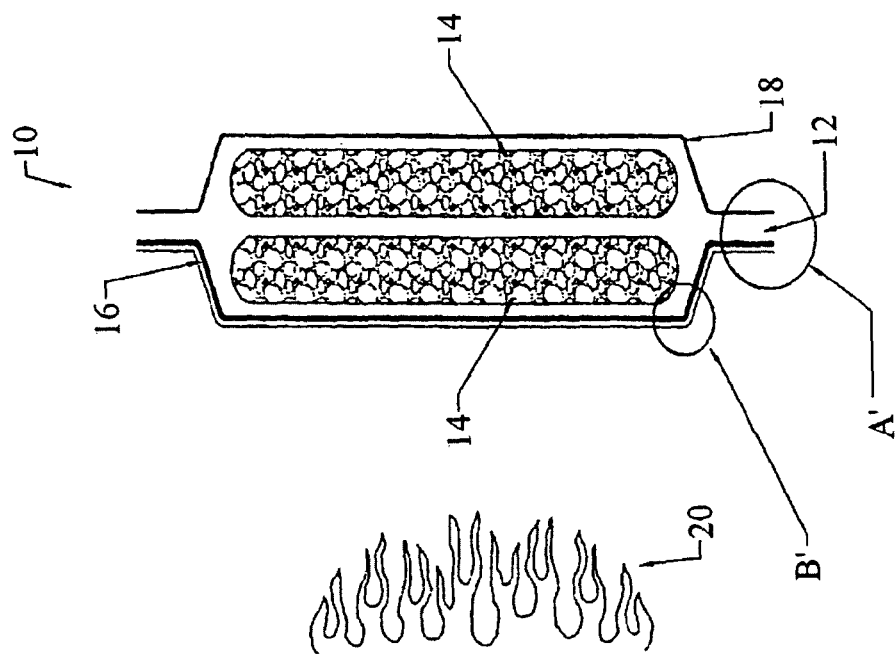
FIG. 1A is a schematic cross-sectional view of a thermal and acoustical aircraft insulation blanket protected by the subject fire-barrier laminate containing the subject fire-blocking paper.

A fire-blocking paper is provided, that is adapted for incorporation into a fire-barrier film laminate for use in thermal and acoustical insulation systems, such as, but not limited to, those used in commercial aircraft. By way of example, but not limitation, the fire-barrier laminate may be used as a covering or layer that is located intermediate insulation material in fuselage wall cavities and the outer skin of an aircraft fuselage (as an outboard layer of an insulation system) or intermediate insulation material in fuselage wall cavities and the interior aircraft trim panels (as an inboard layer of an insulation system).

The incorporation of the subject fire-blocking paper in a fire-barrier laminate, used for protecting thermal and acoustical insulation structures, solves problems previously associated with the use of lightweight ceramic or inorganic papers, which tend to be fragile to handling or in use where harsh mechanical environments are encountered. In the past, lightweight ceramic or inorganic papers, such as mica papers, were not able to be heat-sealed, and/or experienced cracking of the mica paper in handling, with subsequent failure in fire testing.

In certain embodiments, a fire-blocking inorganic fiber paper can be laminated to a flame resistant film. In certain embodiments, the fire-blocking paper may comprise inorganic bio-soluble fiber, chopped glass non-respirable fibers, organic reinforcing fibers, organic binder, and inorganic binder or filler; and, optionally refractory ceramic fiber, in addition to or replacing a portion of the bio-soluble fiber.

This composition provides a light basis weight paper article with surprising resistance to damage associated with handling and use along with the ability to resist flame propagation and flame penetration as defined in 14 CFR §25.856 (a) & (b). The term "basis weight" is defined as the weight per unit area ($g/m^2$). The subject fire-blocking paper, and the laminate incorporating it, are therefore useful in providing fire burn-through protection for thermal and acoustical insulation structures, referred to in the industry as "blankets", for commercial aircraft fuselages, as the subject fire-barrier laminate may have a basis weight of between about 80 to about 120 $g/m^2$, and in certain embodiments between about 90 to about 105 $g/m^2$. However, the subject fire-blocking paper, and the laminate incorporating it, can be used wherever lamination of delicate insulation layers to protective organic layers is desired.

Illustrative examples of the inorganic bio-soluble fiber or refractory ceramic micro fibers include, but are not limited to, ISOFRAX® alkaline earth silicate (AES) fibers, having an average diameter of between about 0.6 microns and about 2.6 microns, and FIBERFRAX® refractory aluminosilicate ceramic fibers (RCF), available from Unifrax I LLC, Niagara Fall, N.Y. Additionally, borosilicate and high silica content fibers capable of resisting 1100° C. temperatures without loss of structural integrity may also be used.

The term "bio-soluble" inorganic fibers refers to fibers that are decomposable is a physiological medium or in a simulated physiological medium such as simulated lung fluid. The solubility of the fibers may be evaluated by measuring the solubility of the fibers in a simulated physiological medium over time. A method for measuring the biosolubility (i.e.— the non-durability) of the fibers in physiological media is disclosed U.S. Pat. No. 5,874,375 assigned to Unifrax I LLC, although other methods are also suitable for evaluating the biosolubility of inorganic fibers.

Without limitation, suitable examples of bio-soluble inorganic fibers that can be used to prepare the fire-blocking paper include those bio-soluble inorganic fibers disclosed in U.S. Pat. Nos. 6,953,757, 6,030,910, 6,025,288, 5,874,375, 5,585,312, 5,332,699, 5,714,421, 7,259,118, 7,153,796, 6,861,381, 5,955,389, 5,928,075, 5,821,183, and 5,811,360, each of which are incorporated herein by reference.

The bio-soluble alkaline earth silicate fibers may comprise the fiberization product of a mixture of oxides of magnesium and silica, commonly referred to as magnesium-silicate fibers. The magnesium-silicate fibers generally comprise the fiberization product of about 60 to about 90 weight percent silica, from greater than 0 to about 35 weight percent magnesia and 5 weight percent or less impurities. According to certain embodiments, the alkaline earth silicate fibers comprise the fiberization product of about 65 to about 86 weight percent silica, about 14 to about 35 weight percent magnesia, 0 to about 7 weight percent zirconia and 5 weight percent or less impurities. According to other embodiments, the alkaline earth silicate fibers comprise the fiberization product of about 70 to about 86 weight percent silica, about 14 to about 30 weight percent magnesia, and 5 weight percent or less impurities. A suitable magnesium-silicate fiber is commercially available from Unifrax I LLC (Niagara Falls, N.Y.) under the registered trademark ISOFRAX. Commercially available ISOFRAX® fibers generally comprise the fiberization product of about 70 to about 80 weight percent silica, about 18 to about 27 weight percent magnesia and 4 weight percent or less impurities.

Alternatively or additionally, the bio-soluble alkaline earth silicate fibers may comprise the fiberization product of a mixture of oxides of calcium, magnesium and silica. These fibers are commonly referred to as calcia-magnesia-silicate fibers. The calcia-magnesia-silicate fibers generally comprise the fiberization product of about 45 to about 90 weight percent silica, from greater than 0 to about 45 weight percent calcia, from greater than 0 to about 35 weight percent magnesia, and 10 weight percent or less impurities. Suitable calcia-magnesia-silicate fibers are commercially available from Unifrax I LLC (Niagara Falls, N.Y.) under the registered trademark INSULFRAX. INSULFRAX® fibers generally comprise the fiberization product of about 61 to about 67 weight percent silica, from about 27 to about 33 weight percent calcia, and from about 2 to about 7 weight percent magnesia. Other commercially available calcia-magnesia-silicate fibers comprise about 60 to about 70 weight percent silica, from about 25 to about 35 weight percent calcia, from about 4 to about 7 weight percent magnesia, and trace amounts of alumina; or, about 60 to about 70 weight percent silica, from about 16 to about 22 weight percent calcia, from about 12 to about 19 weight percent magnesia, and trace amounts of alumina.

Non-respirable glass fibers may include S2 glass fibers, E-glass fibers, and the like. Organic reinforcing fibers may include, but not be limited to, aromatic polyamide, such as aramid fibers or fibrids, such as KEVLAR® fibers or fibrids, NOMEX® fibers or fibrids, and polyacrylonitrile fibers or fibrids. Organic binders that may be used may include, but are not limited to, acrylic, styrene-butadiene, nitrile, polyvinylchloride, silicone, polyvinylacetate, or polyvinylbutyrate latexes. The inorganic binder or filler may include, but not be limited to, clays (such as bentonite, hectorite, kaolinite, montmorillonite, palygorskite, saponite, or sepiolite), crushed inorganic or ceramic fiber, fumed silica, and the like.

The fire-blocking paper can be prepared by combining and mixing the ingredients, such as by forming an aqueous slurry of the formulation ingredients, casting the slurry onto a paper making screen to form a paper web, and dewatering and drying the paper web into sheets or rolls using standard papermaking techniques as described, for example, in U.S. Pat. No. 3,458,329, the disclosure of which is incorporated by reference.

By way of further illustration, the fibers and binder may be combined to form a mixture or slurry. The slurry may be diluted with water to enhance formation, and it may be flocculated with a flocculating agent and drainage retention aid chemicals. Then, the flocculated mixture or slurry may be placed onto a papermaking machine to be formed into the paper. The sheets or rolls may also be formed by vacuum or tape casting the slurry or mixture with conventional equipment, and are typically dried in forced hot air ovens. Hand sheet molds, a fourdrinier paper machine, a rotoformer paper machine, a vertical former or cylinders can be utilized to make the paper.

The fire-blocking paper is laminated to a film, in certain embodiments a flame propagation resistant film, such as but not limited to polyesters, polyimides, polyetherketones, polyetheretherketones, polyvinylfluorides, polyamides, polytetrafluoroethylenes, polyaryl sulfones, polyester amides, polyester imides, polyethersulfones, polyphenylene sulfides, combinations thereof, and the like. Commercially available examples of these films are films sold by E.I. DuPont de Nemours & Co. of Wilmington, Del., such as, a polyester film sold under the trade designation MYLAR®, a polyvinylfluoride film sold under the trade designation TEDLAR®, and a polyimide film sold under the trade designation KAPTON®, and the like. The flame propagation resistant film may be metallized to minimize moisture absorption, particularly on the outboard side, but optionally on the inboard side also. In certain embodiments, the metallized film may have an opaque, low-gloss polymer coating, optionally containing a fire retardant additive.

The film is laminated to the fire-blocking paper using thermal or pressure activated adhesives. In certain embodiments, the adhesive may contain fire retardant additives, and in other embodiments, fire-retardant additives may be absent. Typical adhesives include but are not limited to polyester based adhesives and polyvinyl fluoride based adhesives. Representative examples of fire retardant additives include, but are not limited to, antimony compounds, hydrated alumina compounds, borates, carbonates, bicarbonates, inorganic halides, phosphates, sulfates, organic halogens and organic phosphates. The resulting laminate may additionally include adhesive on one of the outer surfaces to facilitate thermal or ultrasonic bonding of the laminate to companion backside films as currently practiced in the fabrication of thermal acoustic insulation blankets to form a covering, bag, or envelope for the insulation layers, in some embodiments, a partially or substantially totally encapsulated insulation system (air holes may be employed to accommodate pressure variation during flight). Optionally, a mesh scrim, may be disposed within the adhesive or a surface adjacent to the adhesive on at least one side of the paper or film, in order to add strength to the laminate, including puncture or tear resistance. The scrim may be fiberglass, nylon or polyester, in various embodiments, or may be absent for very strong papers.

As shown in FIG. 1A, a thermal acoustic insulation system 10, or "blanket", is depicted in cross-section, in which two insulating layers 14 of one inch thick MICROLITE AA® Premium NR fiberglass insulation (0.42 pcf) (available from Johns Manville International, Inc.) are disposed within a covering of an exteriorly facing fire-barrier laminate 16, and an interiorly facing inboard cover film 18 (optionally, a second fire-barrier laminate). The exteriorly facing film 16 and the inboard film 18 may be heat sealed, as shown by heat seal in encircled section A', with an adhesive 12 to partially or substantially totally envelop or encapsulate the fiberglass insulation layers. Flames 20, depicting the FAA test procedures, are shown proximate to the exteriorly facing fire-barrier laminate 16.

Figure 1B:
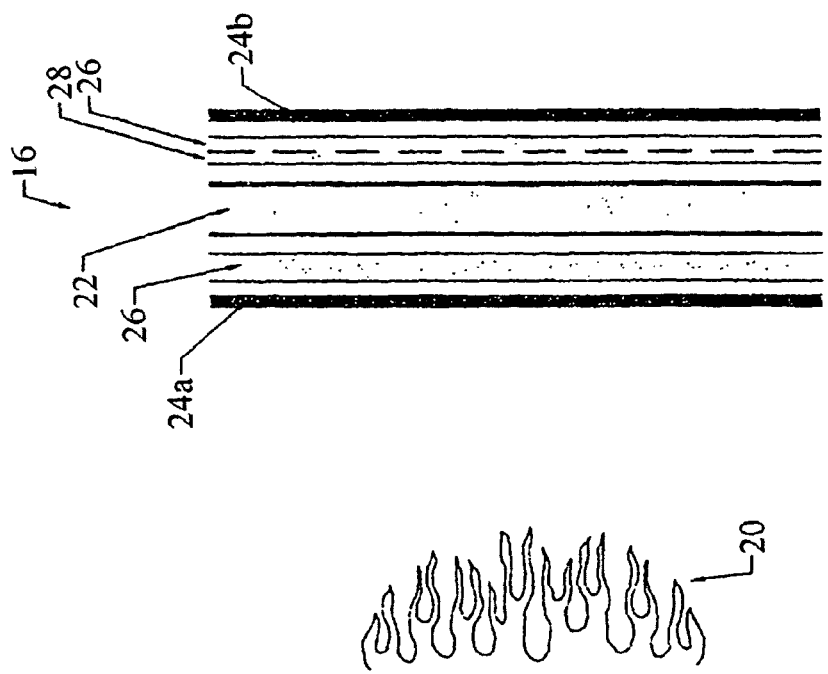
FIG. 1B is an exploded cross-sectional view of the fire-barrier laminate circled portion B' of FIG. 1A.

A detail section of the fire barrier laminate 16, encircled as B' in FIG. 1A is shown in an exploded cross-sectional view in FIG. 1B. The subject fire-blocking paper is shown sandwiched between two layers of film 24a, 24b, optionally a fire-resistant polymeric film, to which it is laminated by intermediately disposed layers of laminating adhesive 26. The adhesive may optionally contain conventional fire-retardant additives, and optionally may be associated with a reinforcing scrim 28, in some embodiments comprising a fiberglass, nylon or polyester mesh, on at least one side of the fire-blocking paper 22 or the film 24b. The scrim may be disposed within the adhesive layer, or may be on the surface of the adhesive.

In certain embodiments, a thermal acoustic insulation system is provided having a basis weight of less than about 120 g/m$^2$, capable of passing the flame propagation and burn-through resistance test protocols of 14 CFR §25.856(a) and (b), Appendix F, Parts VI and VII, comprising:

two layers of about 1 inch thick fiberglass insulation partially or substantially totally enveloped or encapsulated with a fire-barrier laminate; the fire barrier laminate comprising a fire-blocking paper having an outboard surface and an inboard surface, adhesively laminated between a first sheet of flame resistant film and a second sheet of flame resistant film using an adhesive optionally substantially free of fire retardant additives, wherein the first sheet of flame resistant film is proximate to the outboard surface of the fire-blocking paper and is metallized, and the second sheet of flame resistant film is proximate to the inboard surface of the fire-blocking paper;

wherein a mesh scrim is adhesively laminated to at least one surface of the second sheet of flame resistant film;

wherein the fire-blocking paper comprises about 60 to about 74 weight percent bio-soluble alkaline earth silicate fiber, about 3 to about 9 weight percent chopped glass non-respirable fibers, about 4 to about 12 weight percent organic reinforcing fibers, 6 to about 18 weight percent organic binder, and about 2 to about 10 weight percent of inorganic filler, optionally at least one of bentonite, hectorite, kaolinite, montmorillonite, palygorskite, saponite, or sepiolite clay; and, wherein the flame resistant film comprises at least one of polyesters, polyimides, polyetherketones, polyetheretherketones, polyvinylfluorides, polyamides, polytetrafluoroethylenes, polyaryl sulfones, polyester amides, polyester imides, polyethersulfones, polyphenylene sulfides, or combinations thereof.

Example 1

Specimens of fire-barrier laminate-protected thermal and acoustical insulation blankets were prepared for testing according to protocols mandated by the FAA pursuant to 14 CFR §25.856(a) and (b), using a fire-barrier laminate containing a fire-blocking paper, the fire-blocking paper comprising the formulation as set forth in Table 1, and produced as described below.

TABLE 1

Fire Blocking Paper

| Ingredient | Weight % |
|---|---|
| Isofrax ® AES Fiber | 68 |
| Aramid Fiber | 8 |
| S-2 Glass Fiber | 6 |
| Organic Binder | 12 |
| Inorganic Filler | 6 |
| Total | 100 |

The fire-blocking paper formulation ingredients were combined, mixed, and formed into sheets on a paper-making machine using conventional retention mechanisms. The sheets were dried in a forced hot air oven. The fire-blocking paper sheets themselves had a basis weight of 70 g/m$^2$ (0.01435 lbs/ft$^2$).

The fire-blocking paper 22 was sandwiched between and laminated to two sheets of a flame resistant film 24a, 24b, using an adhesive 26 that contained fire retardant additives. A mesh scrim 28 was embedded in the adhesive 26 on one side of the fire-blocking paper 22. The resulting fire-barrier laminate 16 was used to encapsulate two layers of 0.42 pcf MICROLITE AA® fiberglass insulation 14, each of 1 inch thickness, to form the fire-barrier laminate-protected thermal and acoustical insulation blanket 10. The laminate 16 had a basis weight of 94 g/m$^2$.

Test Protocols

The fire-barrier film laminate-protected thermal/acoustic insulation blankets were tested according to the protocols of 14 CFR §25.856(a) and (b), Appendix F, Parts VI and VII, which are incorporated herein in their entirety, as if fully written out below.

14 CFR §25.856(a) and (b) Provide in Pertinent Part:

TABLE 2

§25.856 Thermal/Acoustic insulation materials.

(a) Thermal/acoustic insulation material installed in the fuselage must meet the flame propagation test requirements of part VI of Appendix F to this part, or other approved equivalent test requirements.
(b) For airplanes with a passenger capacity of 20 or greater, thermal/acoustic insulation materials (including the means of fastening the materials to the fuselage) installed in the lower half of the airplane fuselage must meet the flame penetration resistance test requirements of part VII of Appendix F to this part, or other approved equivalent test requirements.

Appendix F Part VI Provides, in Pertinent Part:

TABLE 3

Part VI - Test Method To Determine the Flammability and Flame Propagation Characteristics of Thermal/Acoustic Insulation Materials
Use this test method to evaluate the flammability and flame propagation characteristics of thermal/acoustic insulation when exposed to both a radiant heat source and a flame.

(a) Definitions.

"Flame propagation" means the furthest distance of the propagation of visible flame towards the far end of the test specimen, measured from the midpoint of the ignition source flame. Measure this distance after initially applying the ignition source and before all flame on the test specimen is extinguished. The measurement is not a determination of burn length made after the test.
"Radiant heat source" means an electric or air propane panel.

TABLE 3-continued

Part VI - Test Method To Determine the Flammability and Flame Propagation Characteristics of Thermal/Acoustic Insulation Materials Use this test method to evaluate the flammability and flame propagation characteristics of thermal/acoustic insulation when exposed to both a radiant heat source and a flame.

"Thermal/acoustic insulation" means a material or system of materials used to provide thermal and/or acoustic protection. Examples include fiberglass or other batting material encapsulated by a film covering and foams.
"Zero point" means the point of application of the pilot burner to the test specimen.
(b) Test apparatus.

(4) Pilot Burner. The pilot burner used to ignite the specimen must be a Bernzomatic ™ commercial propane venturi torch with an axially symmetric burner tip and a propane supply tube with an orifice diameter of 0.006 inches (0.15 mm). The length of the burner tube must be 2⅞ inches (71 mm). The propane flow must be adjusted via gas pressure through an in-line regulator to produce a blue inner cone length of ¾ inch (19 mm). A ¾ inch (19 mm) guide (such as a thin strip of metal) may be soldered to the top of the burner to aid in setting the flame height. The overall flame length must be approximately 5 inches long (127 mm). Provide a way to move the burner out of the ignition position so that the flame is horizontal and at least 2 inches (50 mm) above the specimen plane.
(5) Thermocouples. Install a 24 American Wire Gauge (AWG) Type K (Chromel-Alumel) thermocouple in the test chamber for temperature monitoring. Insert it into the chamber through a small hole drilled through the back of the chamber. Place the thermocouple so that it extends 11 inches (279 mm) out from the back of the chamber wall, 11 ½ inches (292 mm) from the right side of the chamber wall, and is 2 inches (51 mm) below the radiant panel. The use of other thermocouples is optional.
(6) Calorimeter. The calorimeter must be a one-inch cylindrical water-cooled, total heat flux density, foil type Gardon Gage that has a range of 0 to 5 BTU/ft$^2$-second (0 to 5.7 Watts/cm$^2$).
(c) Test specimens.

(1) Specimen preparation. Prepare and test a minimum of three test specimens. If an oriented film cover material is used, prepare and test both the warp and fill directions.
(2) Construction. Test specimens must include all materials used in construction of the insulation (including batting, film, scrim, tape etc.). Cut a piece of core material such as foam or fiberglass, and cut a piece of film cover material (if used) large enough to cover the core material. Heat sealing is the preferred method of preparing fiberglass samples, since they can be made without compressing the fiberglass ("box sample"). Cover materials that are not heat sealable may be stapled, sewn, or taped as long as the cover material is over-cut enough to be drawn down the sides without compressing the core material. The fastening means should be as continuous as possible along the length of the seams. The specimen thickness must be of the same thickness as installed in the airplane.
(3) Specimen Dimensions. To facilitate proper placement of specimens in the sliding platform housing, cut non-rigid core materials, such as fiberglass, 12½ inches (318 mm) wide by 23 inches (584 mm) long. Cut rigid materials, such as foam, 11½ +/¼ inches (292 mm +/mm) wide by 23 inches (584 mm) long in order to fit properly in the sliding platform housing and provide a flat, exposed surface equal to the opening in the housing.
(d) Specimen conditioning. Condition the test specimens at 70 +/– 5° F. (21 +/° C.) and 55% +/% relative humidity, for a minimum of 24 hours prior to testing.
(f) Test Procedure.

(1) Ignite the pilot burner. Ensure that it is at least 2 inches (51 mm) above the top of the platform. The burner must not contact the specimen until the test begins.
(2) Place the test specimen in the sliding platform holder. Ensure that the test sample surface is level with the top of the platform. At "zero" point, the specimen surface must be 7½ inches +/⅛ inch (191 mm +/) below the radiant panel.
(3) Place the retaining/securing frame over the test specimen. It may be necessary (due to compression) to adjust the sample (up or down) in order to maintain the distance from the sample to the radiant panel (7 ½ inches +/⅛ inch (191 mm +/) at "zero" position). With film/fiberglass assemblies, it is critical to make a slit in the film cover to purge any air inside. This allows the operator to maintain the proper test specimen position (level with the top of the platform) and to allow ventilation of gases during testing. A longitudinal slit, approximately 2 inches (51 mm) in length, must be centered 3 inches +/½ inch (76 mm +/mm) from the left flange of the securing frame. A utility knife is acceptable for slitting the film cover.
(4) Immediately push the sliding platform into the chamber and close the bottom door.
(5) Bring the pilot burner flame into contact with the center of the specimen at the "zero" point and simultaneously start the timer. The pilot burner must be at a 27° angle with the sample and be approximately ½ inch (12 mm) above the sample. A stop . . . allows the operator to position the burner correctly each time.
(6) Leave the burner in position for 15 seconds and then remove to a position at least 2 inches (51 mm) above the specimen.
(g) Report.

(1) Identify and describe the test specimen.
(2) Report any shrinkage or melting of the test specimen.
(3) Report the flame propagation distance. If this distance is less than 2 inches, report this as a pass (no measurement required).
(4) Report the after-flame time.
(h) Requirements.
(1) There must be no flame propagation beyond 2 inches (51 mm) to the left of the centerline of the pilot flame application.
(2) The flame time after removal of the pilot burner may not exceed 3 seconds on any specimen.

Test Results; Flammability and Flame Propagation

Figure 2:
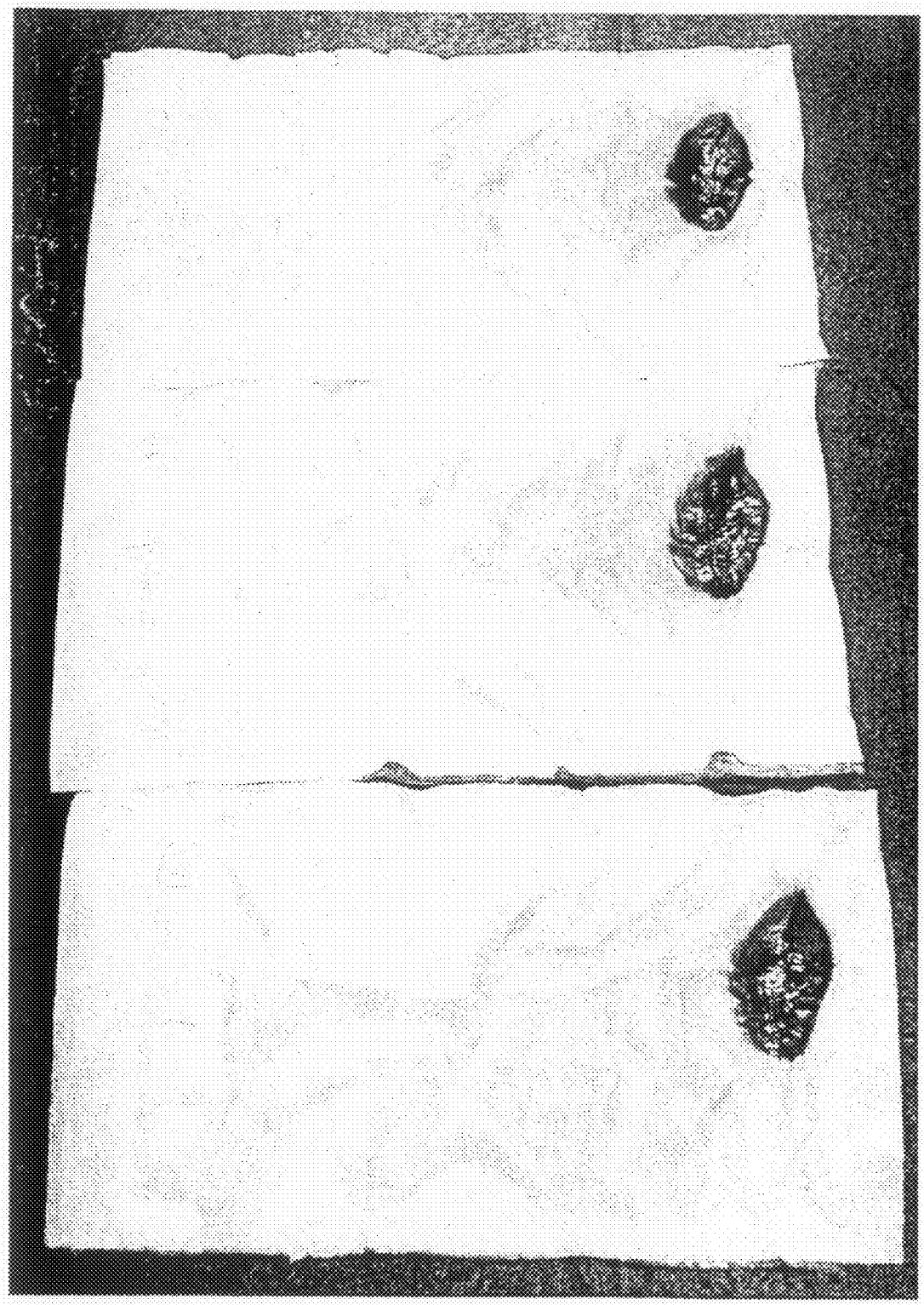
FIG. 2 is a photograph of three fire-barrier laminate-protected thermal and acoustical insulation blanket specimens after a flammability and flame propagation test was completed.

Three specimens of the fire-barrier laminate-protected thermal and acoustical insulation blanket were prepared according to Example 1, and tested according to the protocol of Appendix F Part VI, including apparatus setup and calibration procedures. FIG. 2 is a photograph of the three fire-barrier laminate-protected thermal and acoustical insulation blanket specimens after the Flammability and Flame Propagation test was completed. The test results for all three specimens were reported as a pass, with a flame propagation distance of less than 0.75 inch, and no after-flame.

Appendix F Part VI Provides, in Pertinent Part:

TABLE 4

Part VII - Test Method To Determine the Burnthrough Resistance of Thermal/Acoustic Insulation Materials
Use the following test method to evaluate the burnthrough resistance characteristics of aircraft thermal/acoustic insulation materials when exposed to a high intensity open flame.

(a) Definitions.

Burnthrough time means the time, in seconds, for the burner flame to penetrate the test specimen, and/or the time required for the heat flux to reach 2.0 Btu/ft$^2$sec (2.27 W/cm$^2$) on the inboard side, at a distance of 12 inches (30.5 cm) from the front surface of the insulation blanket test frame, whichever is sooner. The burnthrough time is measured at the inboard side of each of the insulation blanket specimens.
Insulation blanket specimen means one of two specimens positioned in either side of the test rig, at an angle of 30° with respect to vertical.
Specimen set means two insulation blanket specimens. Both specimens must represent the same production insulation blanket construction and materials, proportioned to correspond to the specimen size.
(b) Apparatus.

(3) Calibration rig and equipment.
(i) Construct individual calibration rigs to incorporate a calorimeter and thermocouple rake for the measurement of heat flux and temperature. Position the calibration rigs to allow movement of the burner from the test rig position to either the heat flux or temperature

TABLE 4-continued

Part VII - Test Method To Determine the Burnthrough Resistance of Thermal/Acoustic Insulation Materials
Use the following test method to evaluate the burnthrough resistance characteristics of aircraft thermal/acoustic insulation materials when exposed to a high intensity open flame.

position with minimal difficulty.
(ii) Calorimeter. The calorimeter must be a total heat flux, foil type Gardon Gage of an appropriate range such as 0-20 Btu/ft²-sec (0-22.7 W/cm²), accurate to ±3% of the indicated reading. The heat flux calibration method must be in accordance with paragraph VI(b)(7) of this appendix.
(iv) Thermocouples. Provide seven ⅛-inch (3.2 mm) ceramic packed, metal sheathed, type K (Chromel-alumel), grounded junction thermocouples with a nominal 24 American Wire Gauge (AWG) size conductor for calibration. Attach the thermocouples to a steel angle bracket to form a thermocouple rake for placement in the calibration rig during burner calibration.
(5) Backface calorimeters. Mount two total heat flux Gardon type calorimeters behind the insulation test specimens on the back side (cold) area of the test specimen mounting frame. Position the calorimeters along the same plane as the burner cone centerline, at a distance of 4 inches (102 mm) from the vertical centerline of the test frame.
(i) The calorimeters must be a total heat flux, foil type Gardon Gage of an appropriate range such as 0-5 Btu/ft²-sec (0-5.7 W/cm²), accurate to ±3% of the indicated reading. The heat flux calibration method must comply with paragraph VI(b)(7) of this appendix.
(6) Instrumentation. Provide a recording potentiometer or other suitable calibrated instrument with an appropriate range to measure and record the outputs of the calorimeter and the thermocouples.
(7) Timing device. Provide a stopwatch or other device, accurate to ±1%, to measure the time of application of the burner flame and burnthrough time.
(c) Test Specimens.

(1) Specimen preparation. Prepare a minimum of three specimen sets of the same construction and configuration for testing.
(2) Insulation blanket test specimen.
(i) For batt-type materials such as fiberglass, the constructed, finished blanket specimen assemblies must be 32 inches wide by 36 inches long (81.3 by 91.4 cm), exclusive of heat sealed film edges.
(3) Construction. Make each of the specimens tested using the principal components (i.e., insulation, fire barrier material if used, and moisture barrier film) and assembly processes (representative seams and closures).
(i) Fire barrier material. If the insulation blanket is constructed with a fire barrier material, place the fire barrier material in a manner reflective of the installed arrangement For example, if the material will be placed on the outboard side of the insulation material, inside the moisture film, place it the same way in the test specimen.
(v) Conditioning. Condition the specimens at 70° ± 5° F. (21° ± 2° C.) and 55% ± 10% relative humidity for a minimum of 24 hours prior to testing.
(f) Test procedure.

(1) Secure the two insulation blanket test specimens to the test frame. The insulation blankets should be attached to the test rig center vertical former using four spring clamps . . . (according to the criteria of paragraph (c)(4) or (c)(4)(i) of this part of this appendix).
(2) Ensure that the vertical plane of the burner cone is at a distance of 4 ± 0.125 inch (102 ± 3 mm) from the outer surface of the horizontal stringers of the test specimen frame, and that the burner and test frame are both situated at a 30° angle with respect to vertical.
(3) When ready to begin the test, direct the burner away from the test position to the warm-up position so that the flame will not impinge on the specimens prematurely. Turn on and light the burner and allow it to stabilize for 2 minutes.
(4) To begin the test, rotate the burner into the test position and simultaneously start the timing device.
(5) Expose the test specimens to the burner flame for 4 minutes and then turn off the burner. Immediately rotate the burner out of the test position.
(6) Determine (where applicable) the burnthrough time, or the point at which the heat flux exceeds 2.0 Btu/ft²-sec (2.27 W/cm²).
(g) Report.

(1) Identify and describe the specimen being tested.
(2) Report the number of insulation blanket specimens tested.

TABLE 4-continued

Part VII - Test Method To Determine the Burnthrough Resistance of Thermal/Acoustic Insulation Materials
Use the following test method to evaluate the burnthrough resistance characteristics of aircraft thermal/acoustic insulation materials when exposed to a high intensity open flame.

(3) Report the burnthrough time (if any), and the maximum heat flux on the back face of the insulation blanket test specimen, and the time at which the maximum occurred.
(h) Requirements.

(1) Each of the two insulation blanket test specimens must not allow fire or flame penetration in less than 4 minutes.
(2) Each of the two insulation blanket test specimens must not allow more than 2.0 Btu/ft²-sec (2.27 W/cm²) on the cold side of the insulation specimens at a point 12 inches (30.5 cm) from the face of the test rig.

Test Results; Burn-Through Resistance

Four sets of two specimens of the fire-barrier laminate-protected thermal and acoustical insulation blanket were prepared according to Example 1, and tested according to the protocol of Appendix F Part VII, including apparatus setup and calibration procedures. FIG. 3 is a graph showing the Backside Heat Flux of the four sets of the two fire-barrier laminate-protected thermal and acoustical insulation blanket specimens as a function of time during the burn-through resistance test. All four tests were reported as a pass, with no flame burn-through, and no backside heat flux reaching 2.0 Btu/ft²-sec (2.27 W/cm²).

As shown in the graph of FIG. 3, Test 1 was conducted for five minutes, instead of four minutes as required by the 14 CFR §25.856 burn-through resistance test, with no burn-through occurring and both calorimeters recording no more than about 1.5 Btu/ft²-sec backside heat flux.

Test 2 was conducted for six minutes, instead of the required four minutes, with no burn-through occurring and both calorimeters recording no more than about 1.75 Btu/ft²-sec backside heat flux.

Test 3 was conducted for the required four minute time period, with no burn-through occurring and both calorimeters recording no more than about 1.5 Btu/ft²-sec backside heat flux.

Test 4 was conducted for about seven minutes instead of the required four minutes, on samples that had been mechanically stressed by folding to opposing corners, creasing, and repeating with remaining corners whilst folded to provide an 'x' shaped crease across both panels installed for the test. Again, no burn-through occurred, with the right calorimeter recording no more than about 1.5 Btu/ft²-sec backside heat flux, and the left calorimeter recording less than 2.0 Btu/ft²-sec backside heat flux.

Example 2

Samples of fire-blocking paper comprising the formulation set forth in Table 1, were prepared according to the procedure set forth in Example 1.

Figure 4A:
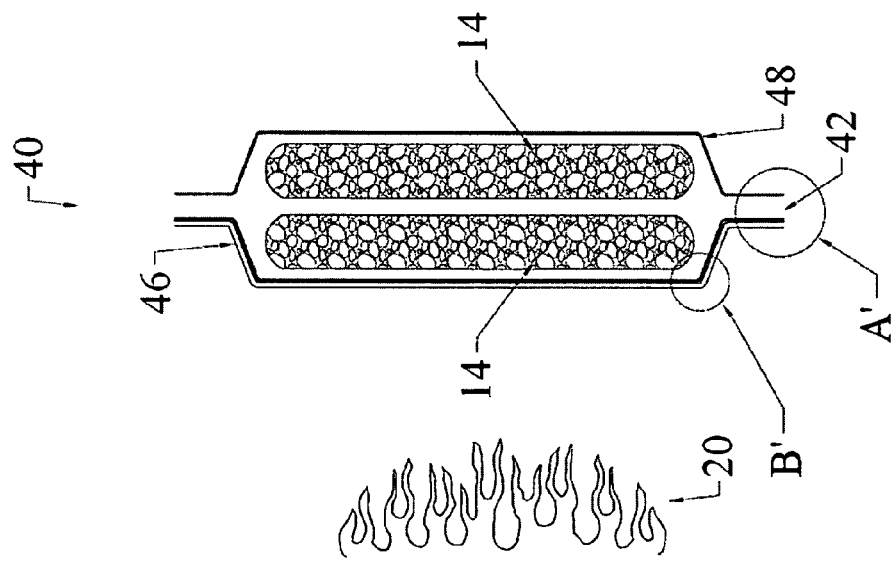
FIG. 4A is a schematic cross-sectional view of a thermal and acoustical aircraft insulation blanket protected by the subject fire-barrier laminate containing the fire-blocking paper.
Figure 4B:
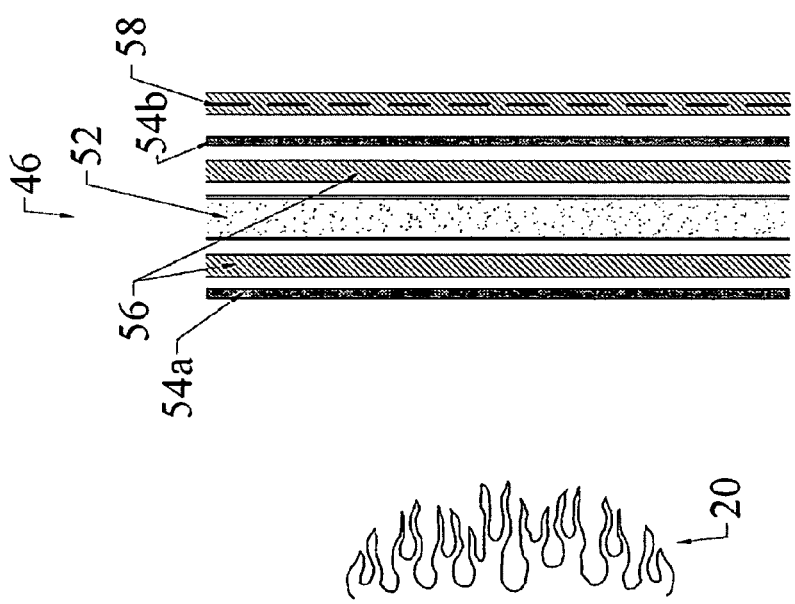
FIG. 4B is an exploded cross-sectional view of the fire-barrier laminate circled portion B' of FIG. 4A.

As shown in FIG. 4B, the fire-blocking paper 52 was sandwiched between and laminated to two sheets of a flame resistant film 54a, 54b, using an adhesive 56 that did not contain fire retardant additives. The flame resistant film 54a was metallized, to minimize moisture permeability. A nylon mesh scrim 58, embedded in adhesive, was laminated to the inboard surface of the flame resistant film 54b on the inboard side of the fire-blocking paper 52. A shown in FIG. 4A, the resulting fire-barrier laminate 46 was used to encapsulate two layers of 0.42 pcf MICROLITE AA® fiberglass insulation 14, each of 1 inch thickness, to form the fire-barrier laminate-protected thermal and acoustical insulation blanket 40.

The fire-barrier laminate 46 had a basis weight of 94.6 g/m$^2$. Other typical properties of the fire-barrier laminate included a thickness of about 0.013 inches (0.33 mm), a tensile strength of about 8 lbs/in (35N/25 mm), a burst strength of about 40 psi (275 kPa), and a puncture resistance (10 mm probe) of about 7.3 lbs. (75 N). The heat seal (T-Peel) strength was typically greater than 2 lbs/in (greater than 9N/25 mm) in each of the warp, fill and bias directions, and the seam resistance to shear was greater than 14N/25 mm. The permeance was 0.5 perms.

The fire barrier film laminate-protected thermal and acoustical insulation blanket 40, prepared according to Example 2, was tested according to the test protocols of 14 CFR §25.856 (a) and (b), Appendix F, Parts VI and VII, set forth above.

Test Results; Flammability and Flame Propagation

Specimens of the fire-barrier laminate-protected thermal and acoustical insulation blanket 40 were prepared according to Example 2 using flame resistant films 54a of 25 gauge polyetheretherketone, and tested according to the protocol of the 14 CFR §25.856(a) Appendix F Part VI Flame Propagation test, including apparatus setup and calibration procedures. The test results for all specimens were reported as a pass, with a flame propagation distance of less than 0.75 inch, and 0 seconds self-extinguishing time (no after-flame).

Test Results; Burn-Through Resistance

Four sets of two specimens of the fire-barrier laminate-protected thermal and acoustical insulation blanket 40 were prepared according to Example 2, and tested according to the protocol of 14 CFR §25.856(a) Appendix F Part VII, including apparatus setup and calibration procedures. FIG. 5 is a graph showing the Backside Heat Flux of the four sets of the two fire-barrier laminate-protected thermal and acoustical insulation blanket specimens as a function of time during the burn-through resistance test. All four tests were reported as a pass, with no flame burn-through, and no backside heat flux reaching 2.0 Btu/ft$^2$-sec (2.27 W/cm$^2$).

As shown in the graph of FIG. 5, all four tests were conducted for six minutes, instead of four minutes as required by the 14 CFR §25.856 burn-through resistance test, with no burn-through occurring and both calorimeters recording no more than about 1.75 Btu/ft$^2$-sec backside heat flux.

The test results prove that, contrary to the teachings in the industry that a lightweight ceramic fire-barrier or thermal insulation layer is too delicate at low basis weights to be employed in practicality, a fire-blocking paper having a low basis weight can be employed in a fire-barrier laminate to provide robust protection to a thermal/acoustic insulation blanket, such as those used in commercial aircraft. The subject fire-blocking paper containing fire-barrier laminate exhibits suitable water resistance as required for applications such as aircraft fuselage insulation.

A particular advantage is obtained using mainly biosoluble fiber, such as but not limited to Isofrax® AES inorganic fibers, in the production of the subject fire-blocking paper. Their use avoids exposure to durable respirable inorganic fibers by workers during the production of the fire-blocking paper, fire barrier laminate, and insulation blanket systems, including installation of the insulation blanket systems, as well as aircraft crew and passengers in the event of the insulation coming into contact with the interior of the cabin.

It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

The invention claimed is:

1. A fire-blocking paper adapted for incorporation into a fire-barrier film, the paper comprising inorganic bio-soluble fiber, chopped glass non-respirable fiber, organic reinforcing fiber, organic binder, and inorganic binder or filler; and, optionally refractory ceramic fiber, wherein the biosoluble fiber comprises at least one of:

the fiberization product of from about 65 to about 86 weight percent silica, from about 14 to about 35 weight percent magnesia, from 0 to about 7 weight percent zirconia, and about 5 weight percent or less impurities; or the fiberization product of from about 60 to about 70 weight percent silica, from about 16 to about 35 weight percent calcia, and from about 4 to about 19 weight percent magnesia; or the fiberization product of from about 61 to about 67 weight percent silica, from about 27 to about 33 weight percent calcia, and from about 2 to about 7 weight percent magnesia.

2. The fire-blocking paper of claim 1, wherein the biosoluble fiber comprises the fiberization product of about 70 to about 80 weight percent silica, about 18 to about 27 weight percent magnesia and 0 to 4 weight percent impurities.

3. The fire-blocking paper of claim 1 wherein the glass fiber comprises S-2 glass fiber.

4. The fire-blocking paper of claim 1 wherein the inorganic binder or filler comprises at least one of bentonite, hectorite, kaolinite, montmorillonite, palygorskite, saponite, or sepiolite clay.

5. A fire-barrier film laminate adapted for incorporation into a thermal and acoustical insulation system, the laminate comprising the fire-blocking paper of claim 1 having an outboard surface and an inboard surface; and, flame propagation resistant film, adhered to the paper outboard surface and inboard surface by a laminating adhesive.

6. The fire-barrier laminate of claim 5 further including a scrim positioned between at least one of the flame propagation resistant film and the paper outboard surface, or the flame propagation resistant film and the paper inboard surface.

7. The fire-barrier laminate of claim 5 further including a scrim adhered to the flame propagation resistant film, the flame propagation resistant film being positioned between the scrim and the paper inboard surface.

8. The fire-barrier laminate of claim 5 wherein the flame propagation resistant film adhered to at least one of the paper inboard surface or paper outboard surface is metallized.

9. The fire-barrier laminate of claim 5 wherein the flame propagation resistant film is at least one of polyesters, polyimides, polyetherketones, polyetheretherketones, polyvinylfluorides, polyamides, polytetrafluoroethylenes, polyaryl sulfones, polyester amides, polyester imides, polyethersulfones, polyphenylene sulfides, or combinations thereof.

10. The fire-barrier laminate of claim 6 wherein the scrim comprises at least one of fiberglass, nylon or polyester mesh.

11. The fire-barrier laminate of claim 5 having a basis weight of less than 120 g/m$^2$.

12. A thermal acoustic insulation system comprising a plurality of insulating layers disposed within a covering of an exteriorly facing fire-barrier laminate as in claim 5, and an interiorly facing inboard cover film.

13. The thermal acoustic insulation system of claim 12 wherein the interiorly facing cover film comprises the fire-barrier laminate.

14. The thermal acoustic insulation system of claim 12 wherein the exteriorly facing fire barrier laminate and the interiorly facing inboard cover film are heat sealed with an adhesive to partially or substantially totally envelop or encapsulate the plurality of insulating layers.

15. The thermal acoustic insulation system of claim 12, wherein the insulating layers comprise fiberglass insulation.

16. The thermal acoustic insulation system of claim 12 capable of passing the flame propagation and burn-through resistance test protocols of 14 CFR §25.856(a) and (b), Appendix F, Parts VI and VII.

17. A thermal acoustic insulation system having a basis weight of less than about 120 g/m² capable of passing the flame propagation and burn-through resistance test protocols of 14 CFR §25.856(a) and (b), Appendix F, Parts VI and VII, comprising:
  two layers of about 1 inch thick fiberglass insulation partially or substantially totally enveloped or encapsulated with a fire-barrier laminate; the fire barrier laminate comprising a fire-blocking paper having an outboard surface and an inboard surface, adhesively laminated between a first sheet of flame resistant film and a second sheet of flame resistant film using an adhesive optionally substantially free of fire retardant additives, wherein the first sheet of flame resistant film is proximate to the outboard surface of the fire-blocking paper and is metallized, and the second sheet of flame resistant film is proximate to the inboard surface of the fire-blocking paper;
  wherein a mesh scrim is adhesively laminated to at least one surface of the second sheet of flame resistant film;
  wherein the fire-blocking paper comprises about 60 to about 74 weight percent bio-soluble alkaline earth silicate fiber, about 3 to about 9 weight percent chopped glass non-respirable fibers, about 4 to about 12 weight percent organic reinforcing fibers, 6 to about 18 weight percent organic binder, and about 2 to about 10 weight percent of at least one of bentonite, hectorite, kaolinite, montmorillonite, palygorskite, saponite, or sepiolite clay; and,
  wherein the biosoluble alkaline earth silicate fiber comprises at least one of:
    the fiberization product of from about 65 to about 86 weight percent silica, from about 14 to about 35 weight percent magnesia, from 0 to about 7 weight percent zirconia, and about 5 weight percent or less impurities; or
    the fiberization product of from about 60 to about 70 weight percent silica, from about 16 to about 35 weight percent calcia, and from about 4 to about 19 weight percent magnesia; or
    the fiberization product of from about 61 to about 67 weight percent silica, from about 27 to about 33 weight percent calcia, and from about 2 to about 7 weight percent magnesia; and,
  wherein the flame resistant film comprises at least one of polyesters, polyimides, polyetherketones, polyetheretherketones, polyvinylfluorides, polyamides, polytetrafluoroethylenes, polyaryl sulfones, polyester amides, polyester imides, polyethersulfones, polyphenylene sulfides, or combinations thereof.

18. The thermal acoustic insulation system of claim 17, wherein the biosoluble alkaline earth silicate fiber comprises the fiberization product of about 70 to about 80 weight percent silica, about 18 to about 27 weight percent magnesia and 0 to 4 weight percent impurities.

* * * * *